(12) United States Patent
Liu et al.

(10) Patent No.: US 11,217,018 B2
(45) Date of Patent: Jan. 4, 2022

(54) POINT CLOUD MEAN BACKGROUND SUBTRACTION BASED METHOD FOR 3D SONAR IMAGE MODELING

(71) Applicant: ZHEJIANG UNIVERSITY, Hangzhou (CN)

(72) Inventors: Xuesong Liu, Hangzhou (CN); Fan Zhou, Hangzhou (CN); Yaowu Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 734 days.

(21) Appl. No.: 16/075,946

(22) PCT Filed: Dec. 8, 2017

(86) PCT No.: PCT/CN2017/115173
§ 371 (c)(1),
(2) Date: Aug. 6, 2018

(87) PCT Pub. No.: WO2018/161664
PCT Pub. Date: Sep. 13, 2018

(65) Prior Publication Data
US 2021/0217240 A1     Jul. 15, 2021

(30) Foreign Application Priority Data
Mar. 8, 2017   (CN) .......................... 201710134480.4

(51) Int. Cl.
G06T 19/00   (2011.01)
G06T 7/136   (2017.01)
G06T 7/194   (2017.01)

(52) U.S. Cl.
CPC .............. *G06T 19/00* (2013.01); *G06T 7/136* (2017.01); *G06T 7/194* (2017.01); *G06T 2207/10028* (2013.01); *G06T 2207/10136* (2013.01)

(58) Field of Classification Search
None
See application file for complete search history.

(56) References Cited

U.S. PATENT DOCUMENTS

| 9,558,564 B1 | 1/2017 | Korchev et al. |
| 2010/0118122 A1 | 5/2010 | Hartman |

(Continued)

FOREIGN PATENT DOCUMENTS

| CN | 103197308 | 7/2013 |
| CN | 103593877 | 2/2014 |

*Primary Examiner* — Frank S Chen
(74) *Attorney, Agent, or Firm* — Jiwen Chen; Jacobson Holman PLLC

(57) ABSTRACT

The present invention discloses a point cloud mean background subtraction based method for 3D sonar image modeling, comprising: (1) obtaining sonar data, and convert 3D sonar range image information corresponding to sonar data per frame into point cloud data for overall coordinate; such point cloud data will form image pixels; (2) taking the mean value u(x,y,z) of pixels at the same position in a series sequential frame images as pixels at the same position in the background model to obtain the background model; define threshold value TH for background standard based on pixel in each image; (3) testing current frame image I(x,y,z) based on background model and threshold value TH to obtain output image; (4) using current frame image I(x,y,z) to update background model and threshold value TH. Such method can quickly identify prospect target in the background, and establish corresponding arithmetic model for further processing; it features in quick processing, which can (Continued)

automatically update background model according to changing environment.

4 Claims, 1 Drawing Sheet

(56) References Cited

U.S. PATENT DOCUMENTS

2016/0306040 A1* 10/2016 Hunt .................. G01S 7/6272
2017/0221450 A1* 8/2017 Kim .................. G06F 1/1684

* cited by examiner

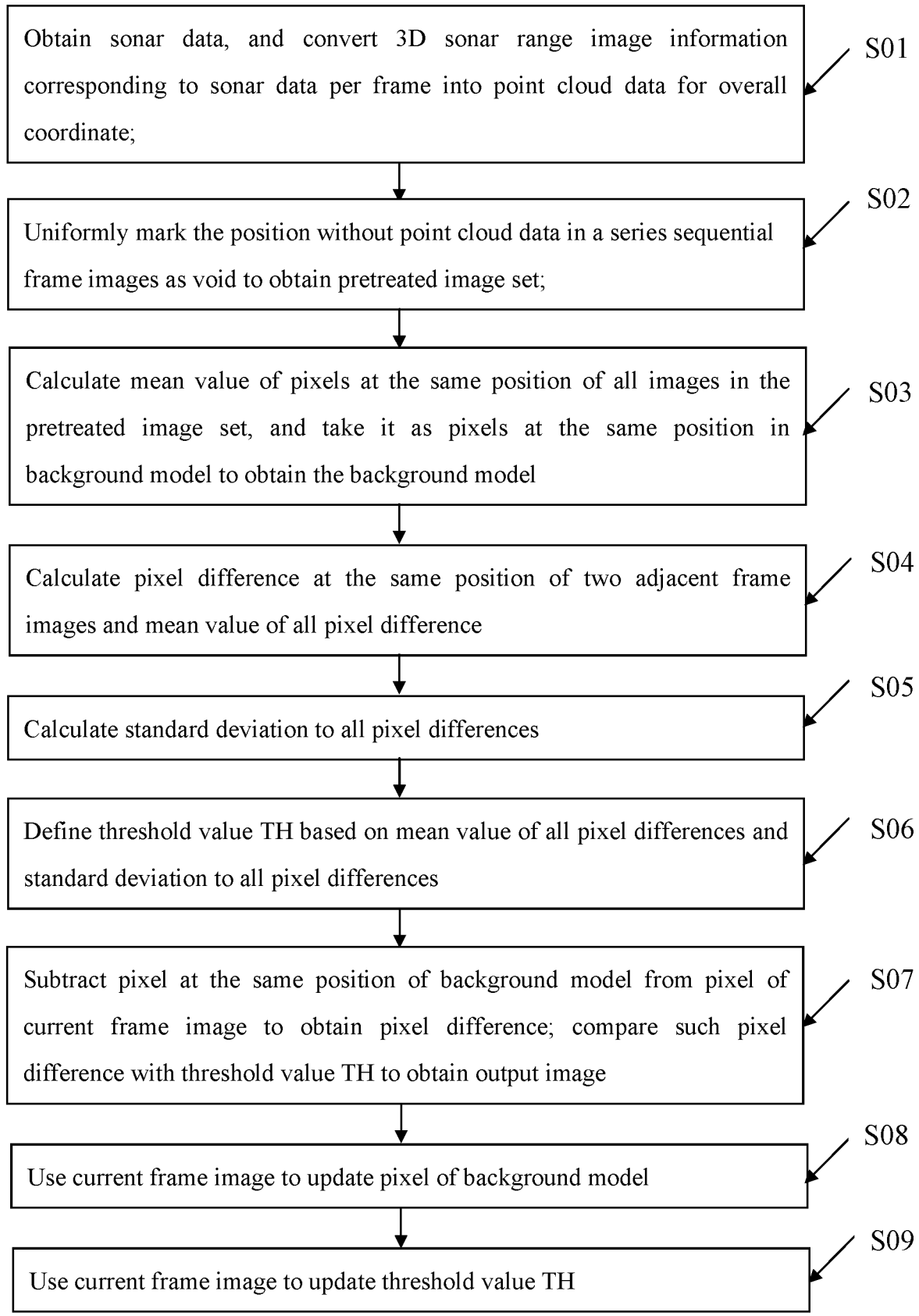

POINT CLOUD MEAN BACKGROUND SUBTRACTION BASED METHOD FOR 3D SONAR IMAGE MODELING

This is a U.S. national stage application of PCT Application No. PCT/CN2017/115173 under 35 U.S.C. 371, filed Dec. 8, 2017 in Chinese, claiming priority of Chinese Application No. 201710134480.4, filed Mar. 8, 2017, all of which are hereby incorporated by reference.

FIELD OF THE INVENTION

The present invention belongs to the field of 3D sonar image modeling, which is in particular related to a point cloud mean background subtraction based method for 3D sonar image modeling.

BACKGROUND ARTS

China is a maritime power that increasingly relies on ocean for sustainable development. Furthermore, ocean has attracted increasingly attentions from people owing to its important strategic role and enormous economic potentials. It goes without saying that comprehensive development of marine sciences and technologies is so important.

As an important branch of marine science and technologies, underwater acoustic detection has extensive application in development of ocean resources; underwater acoustic imaging technology has become an important approach for large-scale underwater detection, which has a broad application prospect in such fields as frogmen detection and tracking, identification and monitoring of naval mines and similar targets, evasion and remote control of underwater vehicles and automatic underwater vehicles as well as navigation.

3D sonar system can obtain target information on distance, horizontality and verticality in 3D space, which features in clear image and good visibility. However, in view of complicated underwater environment and influence from collection environment and noise, there exists high technical difficulty with 3D reconstruction, accurate identification and setup of arithmetic model of targets as well as easy and quick searching and monitoring in the complicated underwater environment based on a large amount of data.

As compared with prospect target to be monitored, background is provided with certain stability and repeatability within a relative long period of time; it is applicable to obtain approximate prospect target through establishment of background model for present environment, comparison between background model and current images and subtraction of background information as known. Therefore, invention of a point cloud background subtraction based method for 3D sonar image modeling has important and practical engineering value.

SUMMARY OF THE INVENTION

In view of foregoing factors, the present invention provides a point cloud background subtraction based method for 3D sonar image modeling. Such method can quickly identify prospect target in the background, and establish corresponding arithmetic model for further processing. It features in quick processing, which can automatically update background model according to changing environment.

A point cloud mean background subtraction based method for 3D sonar image modeling, comprising the following steps:

(1) Obtaining sonar data, and converting 3D sonar range image information corresponding to sonar data per frame into point cloud data for overall coordinate; such point cloud data forming image pixels;

(2) Taking the mean value u(x,y,z) of pixels at the same position in a series sequential frame images as pixels at the same position in the background model to obtain the background model; defining threshold value TH for background standard based on pixel in each image;

(3) Testing current frame image I(x,y,z) based on background model and threshold value TH to obtain output image;

(4) Using current frame image I(x,y,z) to update background model and threshold value TH.

Specific procedures of the Step (2) are stated as follows:

(2-1) Uniformly marking the position without point cloud data in a series sequential frame images as void to obtain pretreated image set;

(2-2) Calculating mean value u(x,y,z) of pixels at the same position of all images in the pretreated image set, and taking the mean value as pixels at the same position in background model to obtain the background model;

(2-3) Calculating absolute value $F_{(t)}(x,y,z)$ of pixel difference at the same position of two adjacent frame images and mean value $u_{diff}(x,y,z)$ of all absolute values of pixel difference; the formula used is as follows:

$$F_{(t)}(x, y, z) = |I_t(x, y, z) - I_{t-gap}(x, y, z)|$$

$$u_{diff}(x, y, z) = \frac{1}{M} \sum_{t=gap+1}^{M} F_t(x, y, z)$$

Wherein, $I_t(x,y,z)$ refers to pixel value at coordinate (x, y and z) of image at the time t; gap refers to time interval between two frame images; $I_{t-gap}(x,y,z)$ refers to pixel value at coordinate (x, y and z) of image at time t-gap; M refers to total frames of images;

(2-4) Calculating standard deviation $\text{diff}_{std}(x,y,z)$ to all pixel differences; the formula used is as follows:

$$\text{diff}_{std}(x, y, z) = \sqrt{\frac{1}{M} \sum_{t=gap+1}^{M} (F_t(x, y, z) - u_{diff}(x, y, z))^2}$$

(2-5) Defining threshold value TH based on mean value $u_{diff}(x,y,z)$ of all pixel differences and standard deviation $\text{diff}_{std}(x,y,z)$ to all pixel differences; the formula used is as follows:

$$TH = u_{diff}(x,y,z) + \beta \times \text{diff}_{std}(x,y,z)$$

Wherein, β is threshold factor normally set as 2.

Specific procedures of the Step (3) are stated as follows:
Subtracting pixel u(x,y,z) at the same position of background model from pixel I(x,y,z) of current frame image to obtain pixel difference d(x,y,z); comparing such pixel difference d(x,y,z) with threshold value TH to obtain output image output(x,y,z) as follows:

$$\text{output}(x, y, z) = \begin{cases} 1, & |d(x, y, z)| > TH \\ 0, & \text{othersize} \end{cases}$$

Wherein, 0 refers to point (x,y,z) that is deemed to be one part of background without output; 1 refers to the fact the point (x,y,z) is different from background model, and is displayed in the output image; outputting image belongs to binary image.

Specific procedures of the Step (4) are stated as follows:

(4-1) Using current frame image I(x,y,z) to updated pixel u(x,y,z) of background model to u'(x,y,z); specific formula used is as follows:

$$u'(x,y,z)=(1-\alpha)\times u(x,y,z)+\alpha\times I(x,y,z)$$

(4-2) Using current frame image I(x,y,z) to update threshold value TH to TH'; specific formula used is as follows:

$$u'_{diff}(x,y,z)=(1-\alpha)\times u_{diff}(x,y,z)+\alpha\times d(x,y,z)$$

$$\text{diff}_{std}(x,y,z)=(1-\alpha)\times\text{diff}_{std}(x,y,z)+\alpha\times|d(x,y,z)-u'_{diff}(x,y,z)|$$

$$TH'=u'_{diff}(x,y,z)+\beta\times\text{diff}_{std}(x,y,z)$$

Wherein, α refers to learning rate that is 0<α<1; the higher α is, the quicker adaptation to changing background will be.

As compared with prior arts, the present invention has the following beneficial technical results:

(1) Following establishment of background model, the present invention can quickly identify prospect targets for corresponding arithmetic modeling, which has good effect in the scene of underwater environment with limited changes to background.

(2) Such method has higher robustness, which can automatically update background model according to changing environment to minimize uncertainties as brought forth by abrupt changes to environment, and enhance reliability of target identification.

(3) Such method is easy and available for quick and efficient modeling after establishment of background model; it has high accuracy in identifying moving targets.

BRIEF DESCRIPTION OF THE DRAWINGS

FIG. 1 is the flow chart for the point cloud mean background subtraction based method for 3D sonar image modeling according to present invention.

PREFERRED EMBODIMENTS OF THE INVENTION

To ensure more comprehensive description of the present invention, technical solutions of the present invention are described in details as follows in combination with FIG. 1 and preferred embodiments.

The point cloud mean background subtraction based method for 3D sonar image modeling according to present invention as shown in FIG. 1, comprising:

S01, Obtaining sonar data including corresponding 3D sonar range image information, and converting 3D sonar range image information corresponding to sonar data per frame into point cloud data for overall coordinate (x, y, z); such point cloud data forming image pixels wherein pixel value of the 3D image pixels comprises positional value defined by the overall coordinate (x, y, z) and corresponding sonar signal intensity value at such position;

S02, Uniformly marking the position without point cloud data in a series sequential frame images as void to obtain pretreated image set;

S03, Calculating mean value u(x,y,z) of pixels at the same position of all images in the pretreated image set, and taking it as pixels at the same position in background model to obtain the background model;

S04, Calculating $F_{(t)}(x,y,z)$ of pixel difference at the same position of two adjacent frame images and mean value $u_{diff}(x,y,z)$ of all pixel difference; the formula used is as follows:

$$F_{(t)}(x, y, z) = |I_t(x, y, z) - I_{t-gap}(x, y, z)|$$

$$u_{diff}(x, y, z) = \frac{1}{M} \sum_{t=gap+1}^{M} F_t(x, y, z)$$

Wherein, $I_t(x,y,z)$ refers to pixel value at coordinate (x, y and z) of image at the time t; gap refers to time interval between two frame images; $I_{t-gap}(x,y,z)$ refers to pixel value at coordinate (x, y and z) of image at time t-gap; M refers to total frames of images;

S05, Calculating standard deviation $\text{diff}_{std}(x,y,z)$ to all pixel differences; the formula used is as follows:

$$\text{diff}_{std}(x, y, z) = \sqrt{\frac{1}{M} \sum_{t=gap+1}^{M} (F_t(x, y, z) - u_{diff}(x, y, z))^2}$$

S06, Defining threshold value TH based on mean value $u_{diff}(x,y,z)$ of all pixel differences and standard deviation $\text{diff}_{std}(x,y,z)$ to all pixel differences; the formula used is as follows:

$$TH=u_{diff}(x,y,z)+\beta\times\text{diff}_{std}(x,y,z)$$

Wherein, β is threshold factor set as 2.

S07, Subtracting pixel u(x,y,z) at the same position of background model from pixel I(x,y,z) of current frame image to obtain pixel difference d(x,y,z); comparing such pixel difference d(x,y,z) with threshold value TH to obtain output image output(x,y,z) as follows:

$$\text{output}(x, y, z) = \begin{cases} 1, & |d(x, y, z)| > TH \\ 0, & \text{othersize} \end{cases}$$

Wherein, 0 refers to point that is deemed to be one part of background without output; 1 refers to the fact the point is different from background model, and is displayed in the output image; output image belongs to binary image.

S08, Using current frame image I(x,y,z) to updated pixel u(x,y,z) of background model to u'(x,y,z); specific formula used is as follows:

$$u'(x,y,z)=(1-\alpha)\times u(x,y,z)+\alpha\times I(x,y,z)$$

S09, Using current frame image I(x,y,z) to update threshold value TH to TH'; specific formula used is as follows:

$$u'_{diff}(x,y,z)=(1-\alpha)\times u_{diff}(x,y,z)+\alpha\times d(x,y,z)$$

$$\text{diff}_{std}(x,y,z)=(1-\alpha)\times\text{diff}_{std}(x,y,z)+\alpha\times|d(x,y,z)-u'_{diff}(x,y,z)|$$

$$TH'=u'_{diff}(x,y,z)+\beta\times\text{diff}_{std}(x,y,z)$$

Wherein, α refers to learning rate that is 0<α<1.

Aforesaid method can quickly identify prospect targets for corresponding arithmetic modeling, which can automatically update background model according to changing environment to minimize uncertainties as brought forth by abrupt changes to environment, and enhance reliability of target identification.

Aforesaid preferred embodiments have provided a detailed description of technical solutions and beneficial results of the present invention; it should be understood that what described above are only optimal embodiments of the present invention, which are not intended to restrict the present invention; any modification, supplement and equivalent substitution as made according to principles of the present invention will fall into the protection scope of the present invention.

The invention claimed is:

1. A point cloud mean background subtraction based method for three-dimensional (3D) sonar image modeling, comprising the following steps:

(1) obtaining sonar data including corresponding 3D sonar range imagine information, and converting the 3D sonar range image information corresponding to the sonar data per frame into point cloud data for overall coordinate (x, y, z), such point cloud data forming 3D image pixels, wherein pixel value of the 3D image pixels comprises positional value defined by the overall coordinate (x, y, z) and corresponding sonar signal intensity value at such position;

(2) calculating and using mean value u(x,y,z) of 3D image pixels at same position in a series of sequential frame images as pixels at the same position to obtain a background model; determining threshold value TH for background standard based on pixel in each frame of image;

(3) testing current frame of image I(x,y,z) based on the background model and the threshold value TH to obtain an output image;

(4) using the current frame of image I(x,y,z) to update the background model and the threshold value TH;

wherein u(x,y,z) refers to the mean sonar signal intensity at coordinate (x, y, z), I(x,y,z) refers to the current frame of image at coordinate (x, y, z), TH refers to a threshold value based on mean value of all pixel differences and standard deviation to all pixel differences.

2. The point cloud background subtraction based method for 3D sonar image modeling according to claim 1, wherein specific procedures of the Step (2) are as follows:

(2-1) uniformly marking positions without point cloud data in a series of sequential frame images as void to obtain a pretreated image set;

(2-2) calculating mean value u(x,y,z) of pixels at the same position of all images in a pretreated image set, and taking the mean value as pixels at the same position to obtain the background model;

(2-3) calculating absolute value $F_{(t)}(x,y,z)$ of pixel difference at the same position of two adjacent frame of images and mean value $u_{diff}(x,y,z)$ of all absolute values of pixel difference; the formula used being as follows:

$$F_{(t)}(x, y, z) = |I_t(x, y, z) - I_{t-gap}(x, y, z)|$$

$$u_{diff}(x, y, z) = \frac{1}{M} \sum_{t=gap+1}^{M} F_t(x, y, z)$$

wherein, $I_t(x,y,z)$ refers to pixel value at coordinate (x, y, z) of image at the time t; gap refers to time interval between two frame images; $I_{t-gap}(x,y,z)$ refers to pixel value at coordinate (x, y, z) of image at time t-gap; M refers to total frames of images;

(2-4) calculating standard deviation to all pixel differences $\text{diff}_{std}(x,y,z)$; the formula used is as follows:

$$diff_{std}(x, y, z) = \sqrt{\frac{1}{M} \sum_{t=gap+1}^{M} (F_t(x, y, z) - u_{diff}(x, y, z))^2}$$

(2-5) defining threshold value TH based on mean value of all pixel differences $u_{diff}(x,y,z)$ and standard deviation to all pixel differences $\text{diff}_{std}(x,y,z)$; the formula used is as follows:

TH=$u_{diff}(x,y,z)$+β×$\text{diff}_{std}(x,y,z)$ wherein, β is threshold factor.

3. The point cloud mean background subtraction based method for 3D sonar image modeling according to claim 1, wherein specific procedures of the Step (3) are stated as follows: subtracting pixel u(x,y,z) at the same position of background model from pixel I(x,y,z) of current frame image to obtain pixel difference d(x,y,z); comparing such pixel difference d(x,y,z) with threshold value TH to obtain output image output(x,y,z) as follows:

$$\text{output}(x, y, z) = \begin{cases} 1, & |d(x, y, z)| > TH \\ 0, & \text{othersize} \end{cases}$$

wherein, 0 refers to point (x,y,z) that is deemed to be one part of background without output; 1 refers to the fact the point is different from background model, and is displayed in the output image; output image belongs to binary image.

4. The point cloud mean background subtraction based method for 3D sonar image modeling according to claim 1, wherein specific procedures of the Step (4) are stated as follows:

(4-1) using current frame of image I(x,y,z) to update pixel u(x,y,z) of the background model to u'(x,y,z); specific formula used is as follows:

u'(x,y,z)=(1−α)×u(x,y,z)+α×I(x,y,z)

(4-2) using current frame of image I(x,y,z) to update the threshold value TH to TH'; specific formula used is as follows:

u'$_{diff}$(x,y,z)=(1−α)×$u_{diff}$(x,y,z)+α×d(x,y,z)

diff'$_{std}$(x,y,z)=(1−α)×$\text{diff}_{std}$(x,y,z)+α×|d(x,y,z)−u'$_{diff}$(x,y,z)|

TH'=u'$_{diff}$(x,y,z)+β×diff'$_{std}$(x,y,z)

wherein, α refers to learning rate that is 0<α<1.

* * * * *